United States Patent Office 3,470,004
Patented Sept. 30, 1969

3,470,004
MORTAR COMPOSITION AND STRUCTURES INCORPORATING SUCH COMPOSITIONS
Edward R. Begley and Robert F. Patrick, Louisville, Ky., and Thomas M. Wehrenberg, Jeffersonville, Ind., assignors to Corhart Refractories Company, Louisville, Ky., a corporation of Delaware
No Drawing. Filed Nov. 22, 1966, Ser. No. 596,079
Int. Cl. C04b 35/120, 35/42, 35/20
U.S. Cl. 106—59                  7 Claims

ABSTRACT OF THE DISCLOSURE

A composition suitable for preparing a refractory mortar comprising from 78 to 92% of fused-cast refractory particles comprising chrome ore and magnesia having a particle size of less than about 50 mesh, from 5 to 10% of a plasticizing agent in the form of filler particles, from 5 to 10% water soluble sodium silicate and from 0.03 to 0.5% organic wetting agent.

---

This invention relates to a mortar composition and structures incorporating such a composition. More particularly, the invention relates to a refractory mortar composition for bonding refractory articles, especially fused-cast refractory chrome magnesia bricks and other bonded basic bricks. The invention also is concerned with structures comprising a plurality of refractory articles bonded by the mortar composition.

Refractory bricks are used in the construction of metallurgical furnaces and the like. It is important that the resulting structures have long life, strength, resistance to corrosion on contact with molten metal and slag, and resistance to thermal and mechanical stresses.

Where direct contact with molten metal and fused basic slag is encountered, basic refractory bricks are ordinarily employed. Typical of such bricks are the fused-cast chrome-magnesia refractory bricks described in U.S. Patent 2,599,566, R. J. Magri, Jr., issued June 10, 1952; 2,690,974, R. J. Magri, Jr. issued Oct. 5, 1954; 3,132,954, A. M. Alper et al., issued May 12, 1964 and 3,198,643, A. M. Alper et al. issued Aug. 3, 1965; and application Ser. No. 435,083 filed Feb. 24, 1965 in the names of R. F. Patrick and T. M. Wehrenberg. All of the cited patents and the pending application are assigned to the assignee of the present invention.

In using the basic fused-cast chrome-magnesia refractory bricks which are the subject of the above patents, it has been found that available mortar compositions have been generally unsatisfactory. The problem stems in part from the fact that it is more difficult to make a fused-cast brick to a particular size than it is to produce a pressed and fired brick to desired specifications. Improved dimensions can be obtained by diamond grinding, but this is expensive. As a result, the fused-cast bricks vary more in dimensions than do conventional refractory bricks. Therefore, it is more difficult to get tight joints with fused-cast bricks than with pressed bricks. Since the joints in a structure made with fused-cast bricks are more open and less regular in size, more mortar is required to fill the gaps between the bricks. Also, since the mortar is normally less resistant to corrosion than the bricks, the wider gaps in fused-cast brick installations offer more vulnerable points for attack by molten metal and slag and make the mortar composition a much more critical factor in achieving long service life. Another problem arising from the wider dimensional tolerances of fused-cast bricks of the present type is that it is more difficult to maintain the structural integrity of an installation when the bricks begin to wear thin towards the end of their useful life, due to poor bonding of existing mortars on the market.

Such mortars adhere or bond poorly to fused-cast brick or re-bonded fused grain brick. The proposed mortar wets and bonds such bodies very strongly, e.g. the modulus of rupture joint bonding strength is on the order of 1000–2000 p.s.i.

Accordingly, a primary object of the present invention is to provide a mortar composition which will permit improved bonding of fused-cast bricks, especially of the chrome-magnesia type. A collateral object of the invention is to provide structures of improved life and corrosion resistance comprising a plurality of refractory articles bonded by a mortar composition.

According to the present invention, there is provided a mortar composition comprising the following constituents:

| | Percent |
|---|---|
| Fused particles of refractory chrome-magnesia having a particle size of less than 50 mesh with the major portion being less than 100 mesh | 78–92 |
| Plasticizing agent | 5–10 |
| Water soluble powdered sodium silicate having a soda to silica ratio of approximately 1:2 and a $Na_2O$ content of approximately 27 percent | 5–10 |
| Organic wetting agent | 0.03–0.5 |

The composition of the fused-cast refractory particles employed in this invention broadly and analytically consists essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, provided that the sum of MgO plus the other constituent or constituents amounts to at least 95% of the particles composition.

For a variety of applications in steelmaking furnaces or vessels, copper producing furnaces and cement producing kilns the composition of the particles desirably consists essentially of, by weight, 50 to 70% MgO, 3 to 18% FeO, not more than 2% CaO, 10 to 25% $Cr_2O_3$, not more than 15% $Al_2O_3$, not more than 5% $TiO_2$, not more than 5% $SiO_2$ and not more than 2% fluorine, provided the sum of these named constituents is at least 95%.

For certain special applications, as in basic oxygen steelmaking vessels utilizing high lime-silica ratio slags, the composition of the refractory particles desirably consists essentially of, by weight, at least 75% MgO, not more than 5% oxide selected from the group consisting of FeO, CaO, BaO, SrO and mixtures thereof, not more than 15% $Cr_2O_3$ and 5 to 15% $TiO_2$, provided the sum of these named constituents is at least 95%.

The fused fines are prepared by melting the necessary ingredients to form a composition of the above analysis, solidifying the melt and comminuting the solid to provide fines of less than 50 mesh. Raw materials suited to produce fines of the above compositions are fully set forth in the above-referenced patents.

A preferred composition of the fused particles consists essentially of, analytically, on a percent by weight basis, about 56.7% MgO, 20.0% $Cr_2O_3$, 9.0% $Al_2O_3$, 10.0% FeO, 0.5% CaO, 1.0% $TiO_2$, 2.5% $SiO_2$ and 0.3% fluorine.

It may be possible to reduce the cost of the above mortar composition by including minor amounts of calcined magnesia and/or chrome ore without losing all the benefits gained from using the fused grain.

As a plasticizing agent, there is preferably employed a kaolin, such as Florida kaolin, having a particle size of less than 40 microns and containing 39% $Al_2O_3$. The inorganic filler particles are added to provide desired workability and plasticity properties.

Other plasticizing agents which might be used in the composition include organic materials such as methyl cellulose or polyethylene glycol, (Carbowax) and inorganic materials such as bentonite clays, etc., but the Florida kaolin, mentioned above is preferred.

A concentrated organic wetting agent is employed in the composition to effect a smaller requirement of water and thereby reduce drying shrinkage to a minimum. A sodium dioctyl sulfosuccinate wetting agent is a preferred material, but other wetting agents may also be employed to reduce the amount of water necessary and to improve the wettability of the solid particles.

The dry materials are thoroughly mixed in a blender and are ready for sale and shipment in that condition. At the point of use, sufficient water is added to form a plastic composition of a consistency such that it can be troweled or dipped and otherwise used as are conventional mortars. Approximately 14% by weight of water, thoroughly blended with the dried powder mix, is sufficient to provide the desired consistency. The quantity of water may be varied depending upon the individual mason's preference, whether vertical or bed joints are being made, etc.

In bonding bricks together, the mortar is applied in conventional fashion. The water from the mortar is absorbed by the brick surfaces and carries small amounts of sodium silicate and fine particles of the fused refractory chrome-magnesia into the pores of the surfaces being bonded. On drying, a bonding strength of approximately 1000 p.s.i. (ASTM–C–199–97, modified) is achieved with fused-cast chrome-magnesia bricks and other direct bonded basic bricks.

As the temperature of a structure incorporating the present mortar is raised during use, the hydraulic bond begins to fail at intermediate temperatures and a ceramic bond forms which maintains the desired strength above 1600° C. The burned mortar is generally resistant to slag corrosion, metal penetration, thermal and mechanical stress, etc.

Among the desirable characteristics of the present mortar composition and the resulting mortar bonded structures are high melting point, low porosity and permeability, high hot-load strength, increased density, and increased thermal conductivity.

In use, the mortar offers the following advantages:

(1) The amount of water required for good troweling and dipping consistency is approximately one-half that needed for other mortars. Undesirable effects of steam escaping from mortared joints when "burning in" is reduced considerably.

(2) Drying and firing shrinkage is very low due to high solids content and small amount of water required for mixing. The present mortar does not overfire or bloat at high temperatures.

(3) Minimum silicates reduces brick penetration so that the mortar does not alter brick properties.

(4) Good bonding strength is maintained at all temperatures.

The invention will be more fully appreciated in the light of the following detailed example.

Example

The following dry powders were mixed in the indicated amounts by weight:

| | Percent |
|---|---|
| Fused chrome-magnesia particles having a size of less than 50 mesh, the major portion of which is less than 100 mesh | 80 |
| Florida kaolin having a particle size of less than 40 microns | 10 |
| Aerosol OT wetting agent | 0.5 |
| Sodium silicate | 9.5 |

The fused chrome-magnesia particles had the following composition, analytically, on a percent by weight basis:

| | Percent |
|---|---|
| MgO | 56.7 |
| $Cr_2O_3$ | 20.0 |
| $Al_2O_3$ | 9.0 |
| FeO | 10.0 |
| CaO | 0.5 |
| $TiO_2$ | 1.0 |
| $SiO_2$ | 2.5 |
| Fluorine | 0.3 |

14% by weight of water was thoroughly mixed with the dry powders to form a composition of trowelable consistency.

(1) The mortar composition was then utilized in bonding together fused-cast chrome-magnesia refractory bricks. The bricks had the same composition as the fused chrome-magnesia particles used in the mortar of the present invention.

Fused-cast chrome-magnesia refractory bricks were then also bonded using commercially available mortars designated as follows:

Mortar A—A wet, air-set, high alumina content mortar.
Mortar B—A dry, air-set, magnesite mortar.
Mortar C—A dry, heat-set, extra-high alumina content mortar.
Mortar D—A dry, air-set magnesite (periclase) mortar.
Mortar E—A dry, air-set magnesite (periclase) mortar.

(2) Other structures were prepared using the present mortar and the above-named commercially available mortars A–E applied to re-bonded fused grain bricks. The bricks had the same composition as the fused chrome-magnesia particles used in the mortar of the present invention.

(3) Other structures were also prepared using commercially available direct bonded chrome-magnesite bricks, some bonded with the mortar of the invention and others with the commercially available mortars A–E.

The structures were cured at temperatures of 100° C., 400° C., 800° C., 1200° C., and 1600° C. After curing at each temperature, the bonding strength, i.e. modulus of rupture at the joints, in pounds per square inch, was measured according to the ASTM test designation C–199–47, modified. The results of the tests are reported in the following table.

TABLE.—MORTAR TEST COMPARISON

[Bonding strength, modulus of rupture (joint) p.s.i. ASTM designation: C–199–47, modified]

| Curing Temp., °C. | Mortar | | | | | Fused chrome-magnesia mortar |
|---|---|---|---|---|---|---|
| | A | B | C | D | E | |
| (1) Fused cast brick | | | | | | |
| 100 | 1,099 | NS | NS | 131 | 227 | 1,185 |
| 400 | 2,521 | NS | NS | NS | NS | 2,365 |
| 800 | 1,692 | NS | NS | NS | NS | 823 |
| 1,200 | 1,334 | 144 | NS | NS | NS | 714 |
| 1,600 | [1]41 | [2]446 | NS | [2]404 | [2]523 | 1,074 |
| (2) Rebonded fused grain brick | | | | | | |
| 100 | 2,000 | NS | NS | 226 | 94 | 774 |
| 400 | 2,810 | NS | NS | 153 | NS | 1,448 |
| 800 | 1,209 | NS | NS | NS | NS | 796 |
| 1,200 | 1,650 | NS | NS | NS | NS | 832 |
| 1,600 | [1]290 | NS | NS | 49 | 302 | 1,405 |
| (3) Direct-bonded chrome magnesite brick | | | | | | |
| 100 | 2,419 | NS | NS | 234 | NS | 1,327 |
| 400 | 2,090 | NS | NS | NS | NS | 873 |
| 800 | 1,818 | 205 | NS | NS | NS | 825 |
| 1,200 | 1,756 | 61 | 537 | 248 | NS | 779 |
| 1,600 | [1]1,392 | NS | 1,215 | 41 | 452 | 1,173 |

[1] The high alkaline silicate mortar completely vitrified at this temperature and ran from the joints or was absorbed by the brick. Weight of top brick closed joint bringing brick faces into contact with each other.
[2] Actual bonding to the fused cast brick was poor. Joint strength came from large pores on the sample face filled with mortar yielding mechanical rather than bonding strength. NS (no strength) indicates that the bond evidenced very low strength, below 20 p.s.i., which is the lowest value measurable on test machine.

It will be seen from the above that very high strength bonding is achieved between fused cast magnesia and basic bricks by use of the present mortar through all temperature ranges. The resulting structures have a minimum bonding strength at the joints in excess of 700 p.s.i., from room temperature to 1600° C. The commercially available mortars either fail to have adequate continuous bonding strength throughout the required temperature range or have very poor refractoriness at high temperatures.

It will be appreciated that the invention is not limited to the specific details set forth in the examples and illustrations, except insofar as is specified in the claims, and that various changes or modifications to meet individual whim or particular need may be made to obtain all or part of the benefits of this invention without departing from the reasonable spirit and scope of the claims therefor.

The embodiments of the invention in which an exclusive property or privilege is claimed are defined as follows:

1. A dry powder composition which upon admixture with water provides an improved refractory mortar composition consisting essentially of, analytically, on a percent by weight basis, (A) from 78 to 92% of fused-cast refractory particles consisting essentially of, by weight on an analytic basis: (1) at least 40% MgO and at least one other constituent selected from the group consisting of: (a) less than 30% of an oxide selected from the group consisting of FeO, CaO, BaO, SrO, and mixtures thereof, (b) up to 58% $Cr_2O_3$, (c) up to 40% $Al_2O_3$, (d) up to 18% $TiO_2$, (e) up to 5% $SiO_2$, and (f) up to 7% fluorine, (2) the sum of MgO plus the other constituents amounting to at least 95% of the composition of fused-cast refractory particles, having a particle size of less than about 50 mesh, the majority of which is less than 100 mesh, (B) from 5 to 10% of a plasticizing agent, (C) from 5 to 10% water soluble sodium silicate, and (D) from 0.03 to 0.5% organic wetting agent.

2. The mortar composition of claim 1 wherein the plasticizing agent comprises kaolin.

3. The composition of claim 1 wherein the water soluble sodium silicate has a soda to silica ratio of approximately 1:2 and a $Na_2O$ content of approximately 27%.

4. The mortar composition of claim 2 wherein the kaolin is in the form of particles having a particle size of less than about 40 microns.

5. A mortar composition consisting essentially of a mixture of a dry powder composition consisting essentially of, analytically, on a percent by weight basis, (A) from 78 to 92% of fused-cast refractory particles consisting essentially of, by weight, on an analytic basis: (1) at least 40% MgO and at least one other constituent selected from the group consisting of: (a) less than 30% of an oxide selected from the group consisting of FeO, CaO, BaO, SrO, and mixtures thereof, (b) up to 58% $Cr_2O_3$, (c) up to 40% $Al_2O_3$, (d) up to 18% $TiO_2$, (e) up to 5% $SiO_2$, and (f) up to 7% fluorine, (2) the sum of MgO plus the other constituents amounting to at least 95% of the composition of fused-cast refractory particles, having a particle size of less than about 50 mesh, the majority of which is less than 100 mesh, (B) from 5 to 10% of a plasticizing agent, (C) from 5 to 10% water soluble sodium silicate, and (D) from 0.03 to 0.5% organic wetting agent and sufficient water to provide a workable plastic mass.

6. The mortar composition of claim 5 wherein the plasticizing agent comprises kaolin.

7. The mortar composition of claim 6 wherein the kaolin is in the form of particles having a particle size of less than about 40 microns.

References Cited
UNITED STATES PATENTS

| | | | |
|---|---|---|---|
| 3,145,188 | 8/1964 | Martinet et al. | 106—59 |
| 3,208,862 | 9/1965 | Davies et al. | 106—84 |
| 3,297,457 | 1/1967 | Charvat | 106—59 |

JAMES E. POER, Primary Examiner

U.S. Cl. X.R.

106—84